(12) United States Patent
Nikaido et al.

(10) Patent No.: US 12,052,493 B2
(45) Date of Patent: Jul. 30, 2024

(54) DRIVING APPARATUS, IMAGE PICKUP APPARATUS, CONTROLLING METHOD FOR DRIVING APPARATUS, AND MEMORY MEDIUM

(71) Applicant: CANON KABUSHIKI KAISHA, Tokyo (JP)

(72) Inventors: Koki Nikaido, Kanagawa (JP); Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 17/745,137

(22) Filed: May 16, 2022

(65) Prior Publication Data

US 2022/0279133 A1    Sep. 1, 2022

Related U.S. Application Data

(63) Continuation of application No. PCT/JP2020/038301, filed on Oct. 9, 2020.

(30) Foreign Application Priority Data

Nov. 18, 2019   (JP) ................. 2019-207663

(51) Int. Cl.
   *H04N 23/65*   (2023.01)
   *H04N 23/54*   (2023.01)
   *H04N 23/68*   (2023.01)

(52) U.S. Cl.
   CPC ......... *H04N 23/651* (2023.01); *H04N 23/687* (2023.01); *H04N 23/54* (2023.01)

(58) Field of Classification Search
   CPC .......... G03B 15/00; G03B 17/00; G03B 5/00; H04N 23/54; H04N 23/651;
   (Continued)

(56) References Cited

U.S. PATENT DOCUMENTS 9,513,492 B2 * 12/2016 Wakamatsu ....... H04N 23/6812
11,716,537 B2 * 8/2023 Ozone .................. H04N 23/683
                                                              348/208.2
(Continued)

FOREIGN PATENT DOCUMENTS

CN     1525744 A    9/2004
CN   106416219 A    2/2017
(Continued)

OTHER PUBLICATIONS

International Search Report dated Dec. 22, 2020 of the corresponding International Application PCT/JP2020/038301.

(Continued)

*Primary Examiner* — Amy R Hsu
(74) *Attorney, Agent, or Firm* — Cowan, Liebowitz & Latman, P.C.

(57) ABSTRACT

A driving apparatus includes a rotation driving unit configured to rotationally drive a movable portion of an image pickup apparatus, a state detecting unit configured to detect a state of the image pickup apparatus, and a controlling unit configured to determine whether or not to perform an initialization operation by the rotation driving unit. The controlling unit determines whether or not to perform the initialization operation based on at least one of a change in the state of the image pickup apparatus during a system off and a change in the state of the image pickup apparatus between at a time of a system shutdown and at a time of a system startup, each change being acquired from an output signal from the state detecting unit.

17 Claims, 11 Drawing Sheets

(58) Field of Classification Search
CPC ............ H04N 23/6812; H04N 23/685; H04N 23/687; H04N 23/695
See application file for complete search history.

(56) References Cited

U.S. PATENT DOCUMENTS

| | | | |
|---|---|---|---|
| 2006/0002697 A1* | 1/2006 | Terashima | G02B 7/102 396/85 |
| 2017/0118411 A1* | 4/2017 | Morinaga | G02B 27/646 |
| 2019/0007617 A1* | 1/2019 | Kitagawa | G03B 5/00 |
| 2019/0132514 A1 | 5/2019 | Ibi | |

FOREIGN PATENT DOCUMENTS

| | | |
|---|---|---|
| CN | 106716989 A | 5/2017 |
| JP | 2003-337276 A | 11/2003 |
| JP | 2009-156982 A | 7/2009 |
| JP | 2015-169932 A | 9/2015 |
| JP | 2016218256 A | 12/2016 |
| JP | 2017-074708 A | 4/2017 |
| JP | 2019007617 A | 1/2019 |
| JP | 2019-161539 A | 9/2019 |

OTHER PUBLICATIONS

PCT/IB/338 (PCT Notification of Transmittal of Translation of the International Preliminary Report on Patentability); PCT/IB/373 (PCT International Preliminary Report on Patentability); PCT/ISA/237 (PCT Written Opinion of the International Searching Authority).

Dec. 27, 2023 Chinese Office Action, that issued in Chinese Patent Application No. 202080079489.X.

May 14, 2024 Chinese Office Action, which is enclosed with an English Translation, that issued in Chinese Patent Application No. 202080079489.X.

* cited by examiner

| | | FIRST CATEGORY | SECOND CATEGORY |
|---|---|---|---|
| | | DETECTABLE DURING SYSTEM OFF | DETECTABLE ONLY DURING SYSTEM ON |
| OUTPUT SIGNAL FROM STATE DETECTING UNIT 213 | ACCELERATION | ○ | ○ |
| | SOUND | ○ | ○ |
| | RELATIVE POSITION | × | ○ |
| | TIME | ○ | ○ |
| | ANGULAR VELOCITY | × | ○ |
| | IMAGE | × | ○ |

DRIVING APPARATUS, IMAGE PICKUP APPARATUS, CONTROLLING METHOD FOR DRIVING APPARATUS, AND MEMORY MEDIUM

CROSS-REFERENCE TO RELATED APPLICATIONS

This application is a Continuation of International Patent Application No. PCT/JP2020/038301, filed on Oct. 9, 2020, which claims the benefit of Japanese Patent Application No. 2019-207663, filed on Nov. 18, 2019, Which is hereby incorporated by reference herein in their entirety.

BACKGROUND OF THE INVENTION

Field of the Invention

The present invention relates to a controlling apparatus that performs an initialization determination process.

Description of the Related Art

When image stabilization is to be performed by rotationally driving a lens barrel (movable portion) of an image pickup apparatus, it is necessary to adjust relative positions of a rotational axis of the movable portion and an axis of a shake detecting sensor (gyro sensor) of a fixed portion. As a method for adjusting the relative positions of the axes, a method (initialization operation) has been known, the method using an optical sensor including a light emitting portion and a light receiving portion to detect a position of the movable portion relative to the fixed portion by setting a position (reset position) at which a light receiving amount of the light receiving portion changes and driving the movable portion so that the movable portion passes through the reset position. In particular, immediately after a system startup, it is necessary to perform such an initialization operation because the movable portion may have been rotated due to an effect of an external force or the like while the system is turned off.

However, performing the initialization operation every time the system is started up may cause the following problems. That is, each process (image stabilization, etc.) of the image pickup apparatus cannot be performed during the initialization operation, the mechanical driving annoys a user, power is consumed because it is necessary to perform rotational driving, image capturing cannot be performed immediately after a startup until the initialization operation ends, and the like.

Therefore, the initialization operation may not be performed depending on a condition at the time of the startup. Japanese Patent Laid-Open No. ("JP") 2017-74708 discloses a method for determining whether or not to perform an initialization process by using a state change during a low power consumption state, when the state returns from the low power consumption state.

However, if the initialization processing determination is made by using only the state change of the image pickup apparatus during the low power consumption state as in the method disclosed in JP 2017-74708, an erroneous determination may be made. For example, in a case where the initialization process determination is made based on a shake during a state in which the image pickup apparatus is turned off, if the image pickup apparatus was continuously shaken because the image pickup apparatus was carried around, etc., it is determined that the initialization operation has to be performed when the image pickup apparatus is started up.

SUMMARY OF THE INVENTION

The present invention provides a controlling apparatus, an image pickup apparatus, a controlling method, and a memory medium each of which can properly perform an initialization determination process without making an erroneous determination.

A driving apparatus as one aspect of the present invention includes a rotation driving unit configured to rotationally drive a movable portion of an image pickup apparatus, a state detecting unit configured to detect a state of the image pickup apparatus, and a controlling unit configured to determine whether or not to perform an initialization operation by the rotation driving unit. The controlling unit determines whether or not to perform the initialization operation based on at least one of a change in the state of the image pickup apparatus during a system off and a change in the state of the image pickup apparatus between at a time of a system shutdown and at a time of a system startup, each change being acquired from an output signal from the state detecting unit.

An image pickup apparatus as one aspect of the present invention includes the driving apparatus and an image pickup unit.

A controlling method for a driving apparatus as one aspect of the present invention is a controlling method for a driving apparatus that includes a rotation driving unit configured to rotationally drive a movable portion of an image pickup apparatus. The controlling method includes detecting a state of the image pickup apparatus by a state detecting unit and determining whether or not to perform an initialization operation by the rotation driving unit. The determining determines whether or not to perform the initialization operation based on at least one of a change in the state of the image pickup apparatus during a system off and a change in the state of the image pickup apparatus between at a time of a system shutdown and at a time of a system startup, each change being acquired from an output signal from the state detecting unit.

A non-transitory computer-readable memory medium as another aspect of the present invention stores a computer program that causes a computer to execute the above controlling method for a driving apparatus.

Further features of the present invention will become apparent from the following description of exemplary embodiments.

DESCRIPTION OF THE EMBODIMENTS

Referring now to the drawings, a description will be given of embodiments according to the present invention.

First Embodiment

Figure 1A:
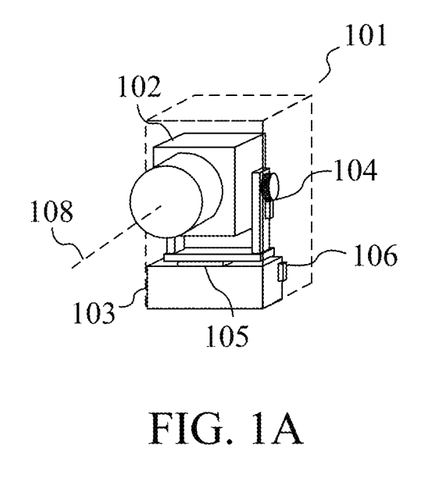
FIGS. 1A to 1D are schematic diagrams each illustrating an image pickup apparatus according to a first embodiment.
Figure 1B:
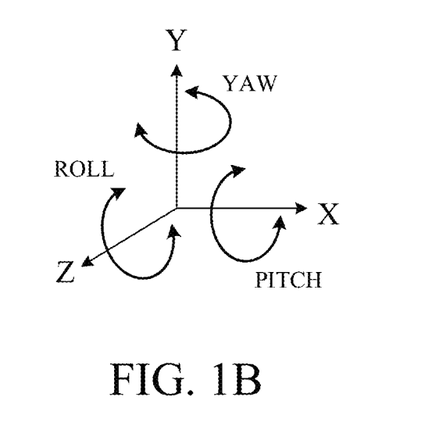
Figure 1C:
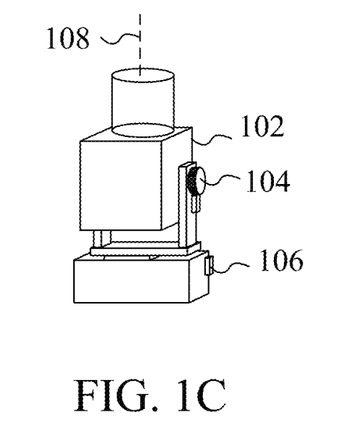
Figure 1D:
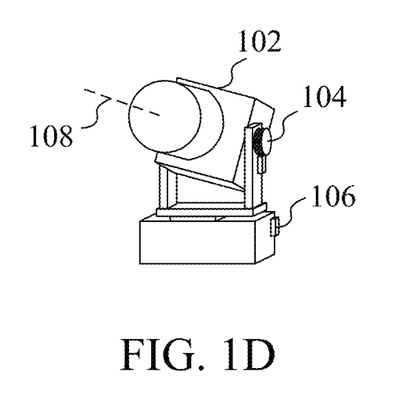

First, a description will be given of a configuration and an operation of an image pickup apparatus (camera) 101 including a driving apparatus according to the first embodiment of the present invention, with reference to FIGS. 1A to 2B. FIGS. 1A to 1D are schematic diagrams illustrating the image pickup apparatus 101. FIG. 1A is an external perspective view illustrating the image pickup apparatus 101. As illustrated in FIG. 1A, the image pickup apparatus 101 includes an operation member including a power switch with which the camera can be operated, and the like. A lens barrel 102 includes an image pickup lens unit as an image pickup optical system for capturing an image and an image sensor and is attached to the image pickup apparatus 101. The lens barrel 102 is a movable portion that can be rotationally driven relative to a fixed portion 103 by a rotation driving mechanism (lens barrel rotation driving unit 212). A tilting rotation unit (motor driving mechanism) 104 is capable of rotating the lens barrel 102 in a pitch direction indicated in FIG. 1B. Thus, the lens barrel 102 can change a direction of an optical axis 108 of the image pickup optical system from a direction illustrated in FIG. 1A to directions illustrated in FIGS. 1C and 1D. A panning rotation unit (motor driving mechanism) 105 is capable of rotating the lens barrel 102 in a yaw direction indicated in FIG. 1B. FIG. 1B indicates definitions of axes at a position of the fixed portion 103. An angular velocity sensor 106 is included in the fixed portion 103 of the image pickup apparatus 101.

Figure 2A:
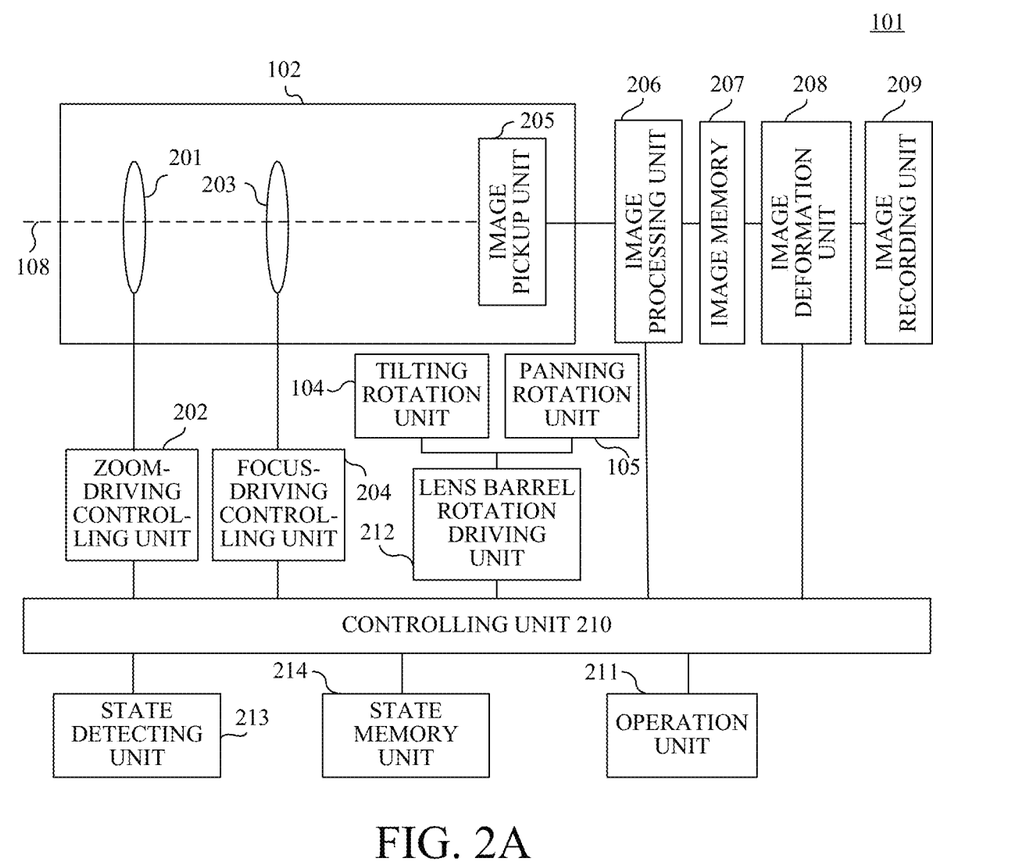
FIGS. 2A and 2B are block diagrams illustrating an image pickup apparatus according to the first embodiment.

FIG. 2A is a block diagram illustrating the image pickup apparatus 101. The image pickup apparatus 101 is capable of performing image stabilization. In FIG. 2A, a zooming unit 201 includes a zoom lens that performs zooming. A zoom-driving controlling unit 202 controls driving of the zooming unit 201. A focusing unit 203 includes a lens that performs focusing. A focus-driving controlling unit 204 controls driving of the focusing unit 203. The zooming unit 201 and the focusing unit 203 are included in an image pickup optical system. The image pickup unit 205 includes an image sensor such as a CMOS sensor, receives light entering through the image pickup optical system, and outputs, as analog image data, charge information according to a light amount of the received light to an image processing unit 206.

The image processing unit 206 applies image processing such as distortion correction, white balance adjustment, and color interpolation processing to digital image data that is output of A/D conversion, and outputs the digital image data to which the image processing has been applied. The image processing unit 206 converts the digital image data into a video signal (image signal) conforming to a format, such as MEG format, NTSC, and PAL, and supplies it to an image memory 207. An image deformation unit 208 outputs an image signal stored in the image memory 207 based on an image deformation amount calculated by a controlling unit 210. An image recording unit 209 records the image signal on a recording medium such as a non-volatile memory.

A lens barrel rotation driving unit (rotation driving unit) 212 changes a direction of the lens barrel 102, i.e., the direction of the optical axis of the image pickup optical system, to a tilting direction and a panning direction by respectively driving the tilting rotation unit 104 and the panning rotation unit 105. A state detecting unit 213 includes, for example, the angular velocity sensor (gyro sensor) 106, a time measuring apparatus, a sound sensor, or the like, the angular velocity sensor 106 detecting an angular velocity in a three-axis direction of the image pickup apparatus 101. A state memory unit 214 stores the output signal from the state detecting unit 213. An operation unit 211 is an operation unit that a user operates to instruct an operation to the image pickup apparatus 101 and includes a power button of the image pickup apparatus 101 and a button via, which a setting of the image pickup apparatus 101 can be changed. The controlling unit 210 controls an entire system of the image pickup apparatus 101.

Figure 2B:
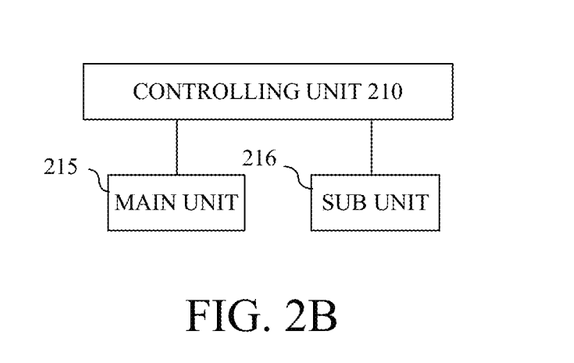

FIG. 2B is a block diagram illustrating an internal configuration of the controlling unit 210. The controlling unit 210 includes a main unit 215 and a sub unit 216. The main unit 215 operates only during a system-on state (a state in which power of the image pickup apparatus 101 is on or a state that has been returned from a low power consumption mode). The sub unit 216 also operates in a system-off state (a state in which the power of the image pickup apparatus 101 is off or a state of the low power consumption mode).

Figure 3:
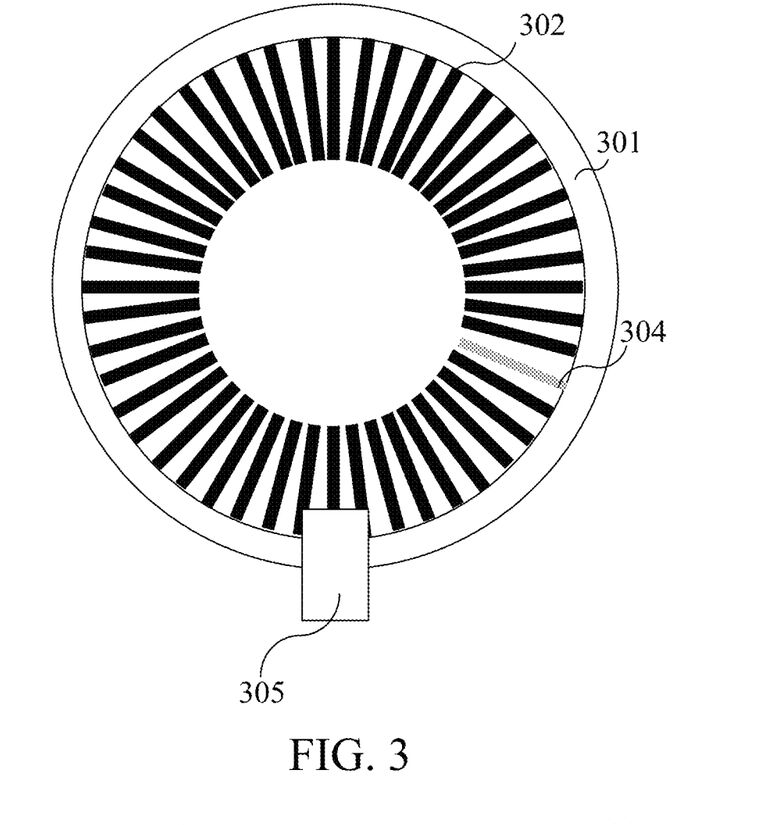
FIG. 3 is a schematic diagram illustrating a photo-interrupter and a pulse plate according to the first embodiment.
Figure 4A:
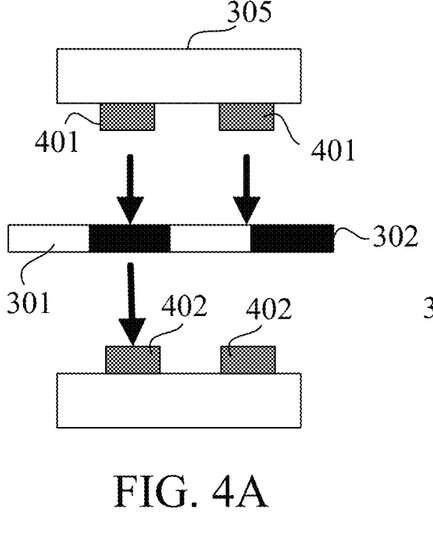
FIGS. 4A and 4B are sectional views each illustrating the photo-interrupter and the pulse plate according to the first embodiment.
Figure 4B:
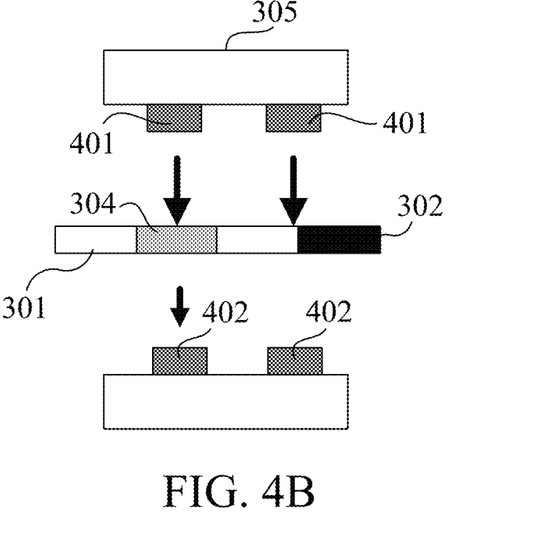

Next, a description will be given of a photo-interrupter 305 and a pulse plate 301 of an optical sensor that is a part of the lens barrel rotation driving unit 212 with reference to FIGS. 3 to 4B. FIG. 3 is a schematic diagram illustrating the photo-interrupter 305 and the pulse plate 301. Each of FIGS. 4A and 4B is a sectional view of the photo-interrupter 305 and the pulse plate 301 and illustrates a state in which a slit 302 of the pulse plate 301 passes through the photo-interrupter 305.

A light emitting portion 401 continuously emits light from when the power of the image pickup apparatus 101 is turned on to when the power of the image pickup apparatus 101 is turned off. A light receiving portion 402 converts the light from the light emitting portion 401 into an electrical signal. The larger a light amount received by the light receiving portion 402, the larger the electrical signal converted by the light receiving portion 402.

In an initialization operation of the image pickup apparatus 101, first, the lens barrel 102 as the movable portion is driven along the pulse plate 301. As compared to light passing through the slit 302, light passing through a transmissive portion 304 is small, and therefore an output electrical signal is also small. A position where this electric signal is smaller than a threshold (a position of the movable portion at a time when the transmissive portion 304 passes through the photo-interrupter 305) is detected. A reference position is set to the detected position, and the lens barrel rotation driving unit 212 rotates the lens barrel 102 to the reference position. The lens barrel rotation driving unit 212 performs such initialization operations for the panning and tilting axes by respectively using the panning rotation unit 105 and the tilting rotation unit 104.

Figure 5:
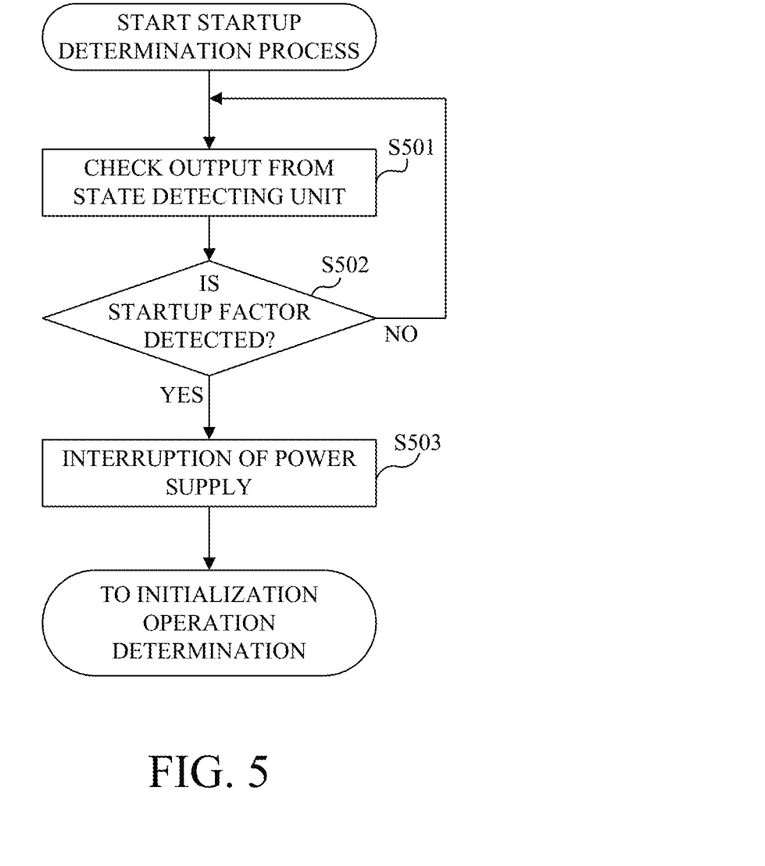
FIG. 5 is a flowchart illustrating a startup determination process according to the first embodiment.

Next, with reference to FIG. 5, a description will be given of a process (startup determination process) performed by the sub unit 216 of the controlling unit 210 of the image pickup apparatus 101 until the image pickup apparatus 101 including the main unit 215 is started up (system startup). FIG. 5 is a flowchart illustrating the startup determination process. Each step in FIG. 5 is mainly executed by the sub unit 216 of controlling unit 210.

First, in step S501, the image pickup apparatus 101 is in a state of off (system-off state), and the sub unit 216 polls (checks) the output signal from the state detecting unit 213 at regular intervals. Subsequently, in step S502, the sub unit 216 determines whether or not a startup factor has been detected. The startup factor includes sound information such as audio recognition, sound scene recognition, and sound level change, start button press detection, output from a motion sensor such as an acceleration sensor and a gyro sensor, a passage of a predetermined time, a wireless, USB, or wired communication connection from an external apparatus, and the like. However, the startup factor is not limited to these. If the sub unit 216 detects the startup factor, the process proceeds to step S503. In step S503, interruption of power supply is caused by the sub unit 216, and the image pickup apparatus 101 including the main unit 215 of the controlling unit 210 is started up. On the other hand, if the sub unit 216 has not detected the startup factor, the sub unit 216 does not activate the image pickup apparatus 101, and the process returns to step S501.

Figure 6:
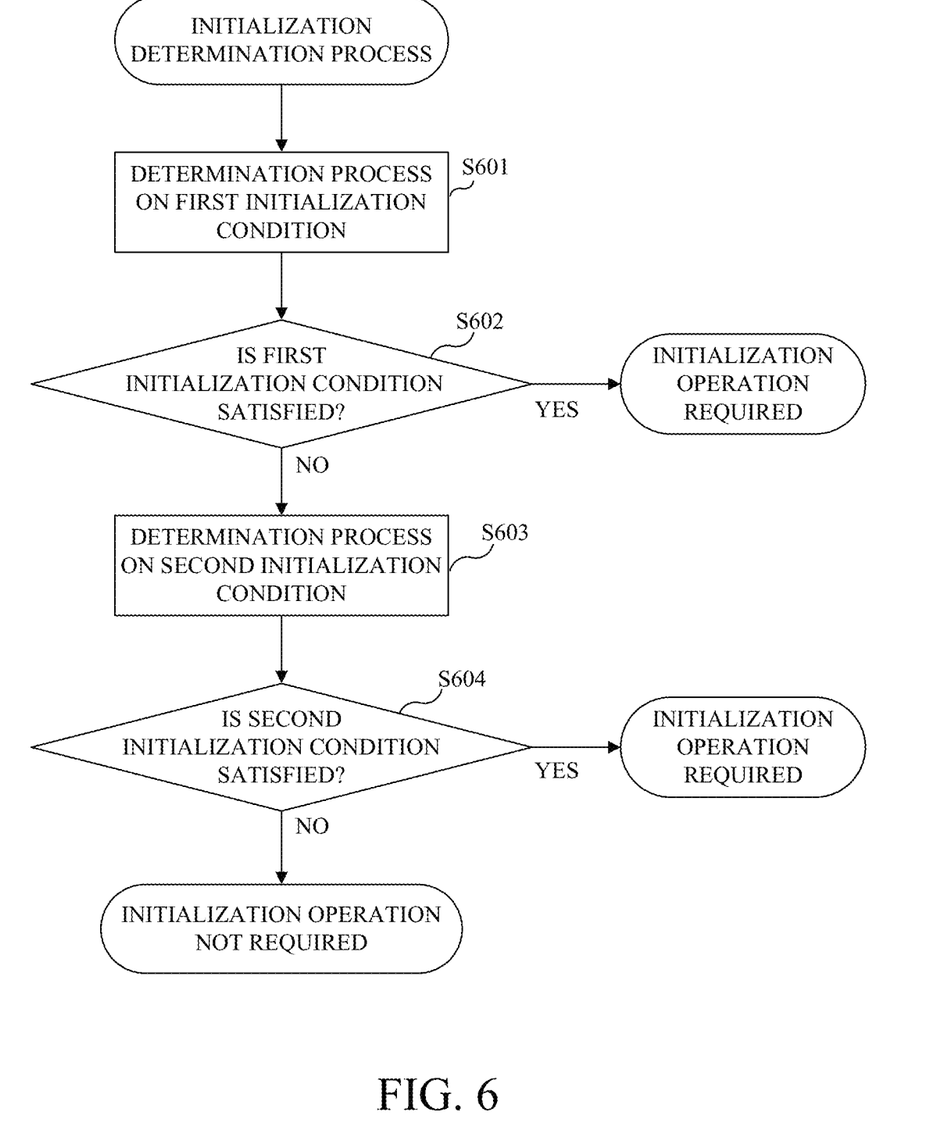
FIG. 6 is a flowchart illustrating an initialization determination process according to the first embodiment.
Figure 7:
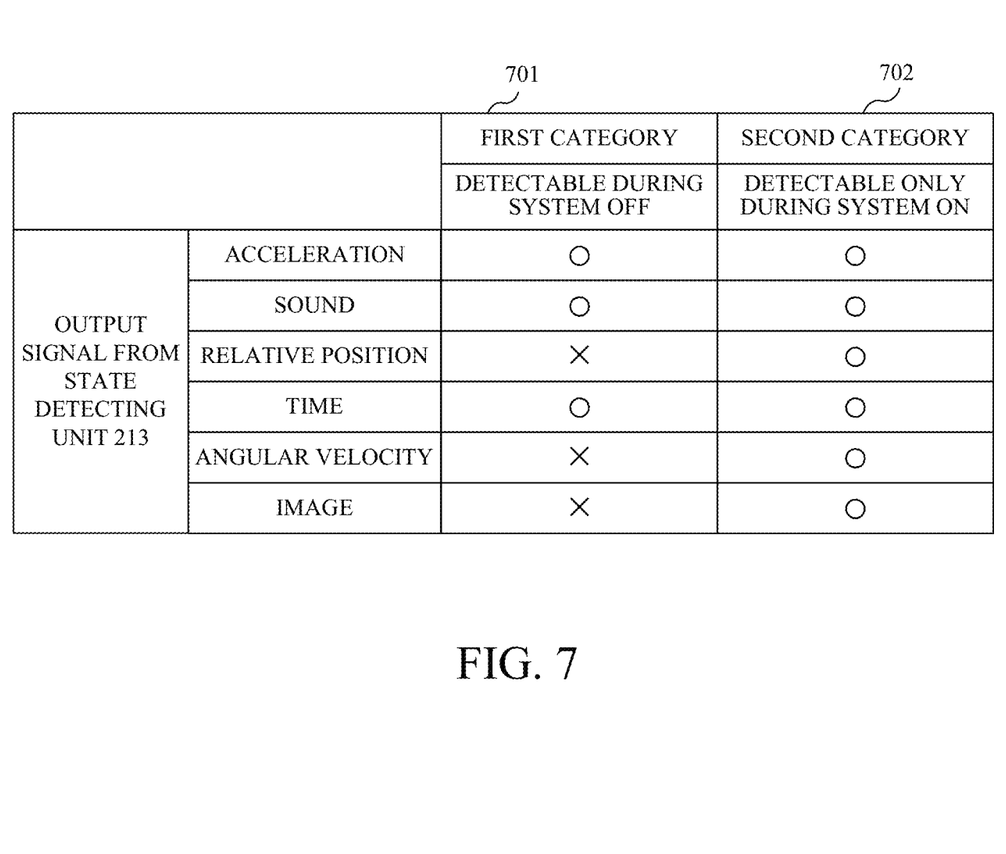
FIG. 7 is a table in which output signals from a state detecting unit are categorized, according to the first embodiment.

Next, an initialization determination process will be described with reference to FIGS. 6 and 7. FIG. 6 is a flowchart illustrating the initialization determination process. Each step in FIG. 6 is mainly executed by the controlling unit 210. FIG. 7 is a table in which the output signals from the state detecting unit 213 are categorized. In the initialization determination process, the output signal from the state detecting unit 213 is categorized as indicated in FIG. 7, and the controlling unit 210 determines whether or not the output signal from the state detecting unit 213 satisfies an initialization condition. In this embodiment, the initialization condition includes at least one of a first initialization condition and a second initialization condition.

The first initialization condition is a condition relating to a state change of the image pickup apparatus 101 during the system off of the image pickup apparatus 101 (during a state in which the power of the image pickup apparatus 101 is off or during the low power consumption mode), the state change being acquired from the output signal from the state detecting unit 213. The second initialization condition is a condition relating to a state change (state deviation) between at the time of a system shutdown of the image pickup apparatus 101 (when the power of the image pickup apparatus 101 is turned off or in a transition to the low power consumption mode) and at the time of a system startup of the image pickup apparatus 101 (when the power of the image pickup apparatus 101 is turned on or in a return from the low power consumption mode).

First, in step S601, the controlling unit 210 performs a determination process on the first initialization condition. FIG. 7 is a table in which the output signals from the state detecting unit 213 are sorted into categories based on when the output signals are detectable. In this embodiment, the categories are a first category 701 and a second category 702. The first category 701 relates to output signals that can be detected even during the system off. The second category 702 relates to output signals that can be detected only while the system is on. The controlling unit 210 stores the output signal from the state detecting unit 213 of the first category 701 in the state memory unit 214 while the system is off.

Subsequently, in step S602, the controlling unit 210 determines whether or not the output signal stored in the state memory unit 214 exceeds an initialization threshold (predetermined threshold). If the output signal stored in the state memory unit 214 exceeds the initialization threshold (if the first initialization condition is satisfied), the controlling unit 210 determines that the initialization operation is required to be performed. On the other hand, if the output signal stored in the state memory unit 214 does not exceed the initialization threshold, the process proceeds to step S603.

Figure 8:
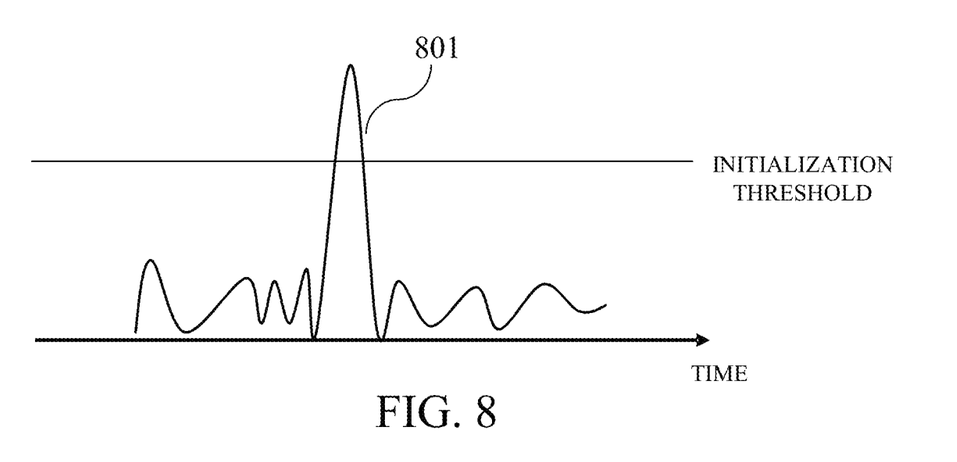
FIG. 8 is a graph of output signals from an acceleration sensor according to the first embodiment.

Here, as an example, a case will be described in which the state detecting unit 213 includes an acceleration sensor. In this case, the controlling unit 210 defines, as the initialization threshold, an output signal (shake) from the acceleration sensor with which the initialization operation is required. FIG. 8 is a graph of the output signals from the acceleration sensor. In FIG. 8, a horizontal axis represents time and a vertical axis represents output signal. As indicated in FIG. 8, if the output signal 801 from the acceleration sensor stored during the system off exceeds the initialization threshold, the controlling unit 210 assumes that the state of the image pickup apparatus 101 has changed, determines that the first initialization condition is satisfied, and performs the initialization operation.

Subsequently, in step S603 of FIG. 6, the controlling unit 210 performs a determination process on the second initialization condition. During the system off, the controlling unit 210 stores, in the state memory unit 214, the output signal from the state detecting unit 213 categorized in the second category 702. At a next startup, the controlling unit 210 compares the output signal stored in the state memory unit 214 with an output signal acquired from the state detecting unit 213 and determines whether or not there is a deviation between these output signals. Subsequently, in step S604, if there is a deviation between the output signal stored in the state memory unit 214 and the output signal acquired from the state detecting unit 213, the controlling unit 210 determines that the second initialization condition is satisfied and the initialization operation is required. On the other hand, if there is no deviation, the controlling unit 210 determines that neither the second initialization condition nor the first initialization condition is satisfied. At this time, the initialization operation is not required.

Figure 9A:
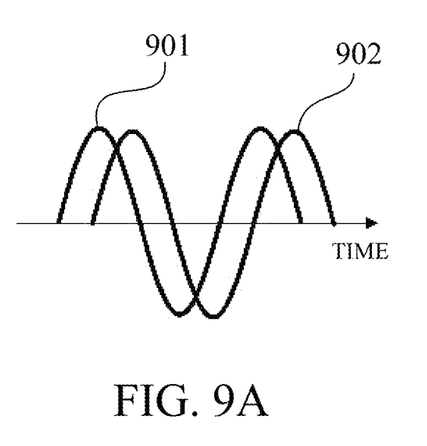
FIGS. 9A and 9B indicate output signals from the photo-interrupter according to the first embodiment.
Figure 9B:
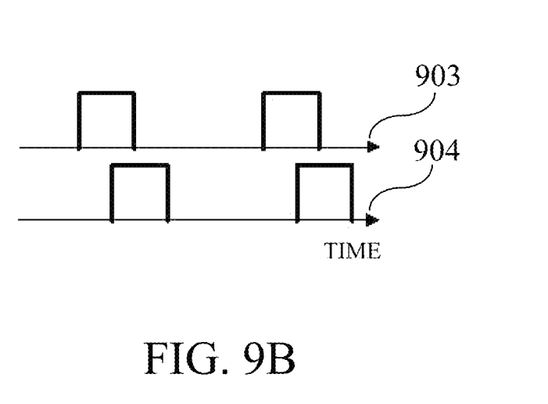

Here, as an example, a case will be described in which the state detecting unit 213 includes a position detecting sensor. FIGS. 9A and 9B are diagrams illustrating output signals from the position detecting sensor. FIGS. 9A and 9B are diagrams illustrating temporal changes in the output signals from the position detecting sensor. In FIGS. 9A and 9B, a horizontal axis represents time and a vertical axis represents output signal. In FIG. 9B, a signal 903 is a binarized signal of a signal 901, and a signal 904 is a binarized signal of a signal 902. An edge of a binarized signal (a change from a high level to a low level or from the low level to the high level) is detected and the number of detected edges is counted as relative positions. In advance, a deviation threshold is defined to be a deviation (relative position) of the output signals from the position detecting sensor with which the initialization operation is required. The controlling unit 210 compares an output signal from the position detecting sensor stored at the last system shutdown with an output signal from the position detecting sensor at the time of the system startup. As a result of the comparison, if the deviation exceeds the threshold (deviation threshold), the controlling unit 210 determines that the second initialization condition is satisfied.

Alternatively, in a case where image information is used as the second initialization condition, the controlling unit 210 compares an image captured at the system shutdown with an image captured at the next startup. If a vector size (optical flow) exceeds a threshold, or if a histogram of the two images or similarity of feature points is lower than a threshold, the controlling unit 210 determines that the second initialization condition is satisfied.

In this embodiment, the controlling unit 210 determines not to perform the initialization operation if neither the first initialization condition nor the second initialization condition is satisfied, but may determine not to perform the initialization operation if either the first initialization condition or the second initialization condition is not satisfied. Thus, in this embodiment, the controlling unit 210 determines whether or not to perform the initialization operation based on at least one of the first initialization condition and the second initialization condition acquired from the output signal from the state detecting unit 213. Thereby, the initialization determination process can be properly performed without an erroneous determination being made.

Second Embodiment

Figure 10:
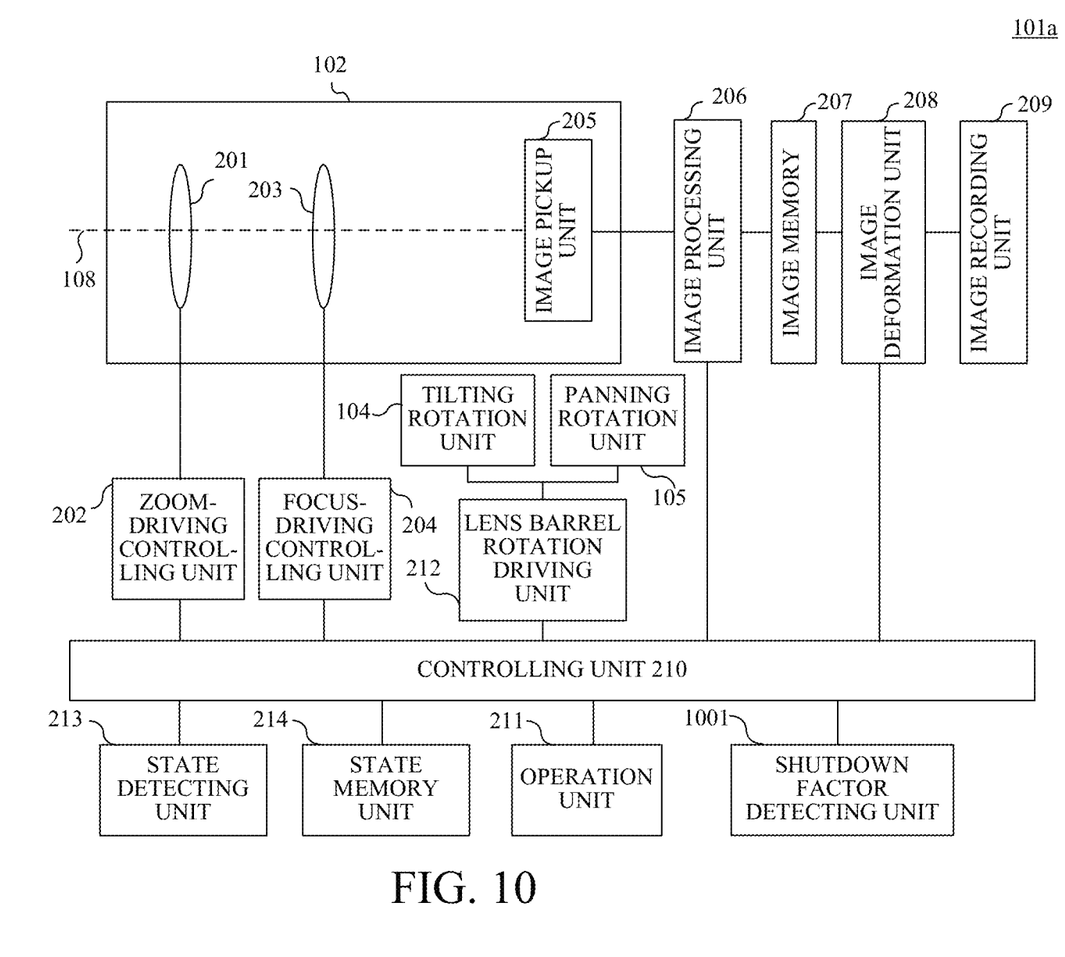
FIG. 10 is a block diagram illustrating an image pickup apparatus according to a second embodiment.

Next, the second embodiment of the present invention will be described. This embodiment describes a process of determining the initialization operation of the rotational axis based on a factor of the system shutdown. FIG. 10 is a block diagram illustrating an image pickup apparatus (driving apparatus) 101a according to this embodiment. The image pickup apparatus 101a according to this embodiment is different from the image pickup apparatus 101 according to the first embodiment in including a shutdown factor detecting unit 1001. The shutdown factor detecting unit 1001 detects a system shutdown factor during a transition to the system-off state of the image pickup apparatus 101a that has been started up. The other configurations of the image pickup apparatus 101a are similar to the configurations of the image pickup apparatus 101, and thus the description thereof will be omitted.

Figure 11:
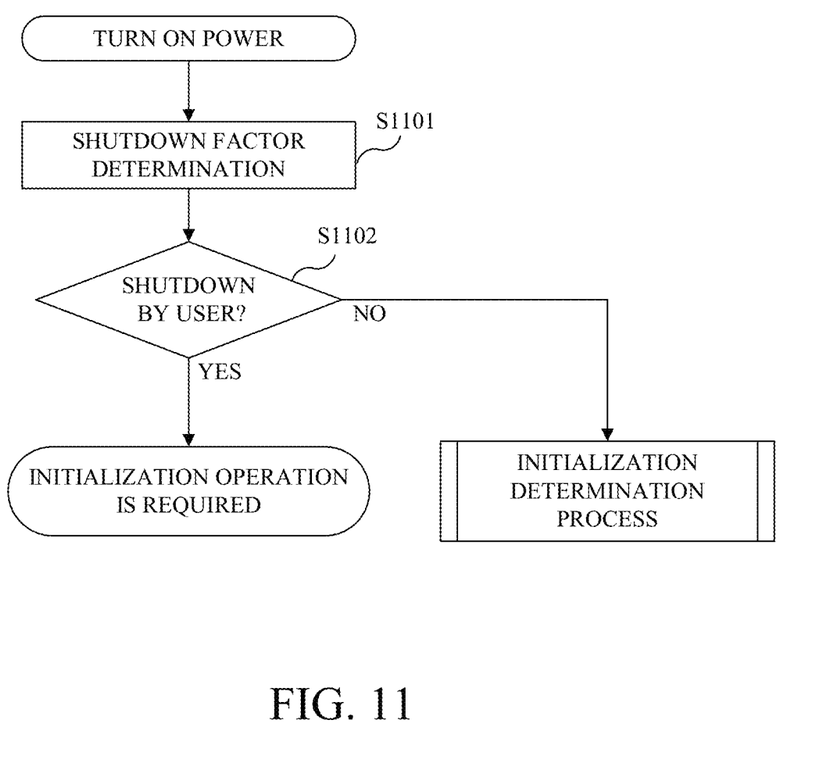
FIG. 11 is a flowchart illustrating preprocessing for an initialization determination process according to the second embodiment.

FIG. 11 is a flowchart illustrating preprocessing for an initialization determination process according to this embodiment. Each step in FIG. 11 is mainly executed by the controlling unit 210 of the image pickup apparatus 101a. Processes other than the flowchart of FIG. 11 are similar to processes in the first embodiment, and thus the description thereof will be omitted.

During the system shutdown of the image pickup apparatus 101a, the shutdown factor detecting unit 1001 detects the system shutdown factor. During the next startup of the image pickup apparatus 101a, in step S1101, the controlling unit 210 determines the system shutdown factor. Subsequently, in step S1102, the controlling unit 210 determines whether or not the system shutdown factor is a shutdown caused by a user. That is, if the system shutdown factor is a power button of the image pickup apparatus 101a, an application that operates the image pickup apparatus 101a, or an audio command, the controlling unit 210 determines that the system of the image pickup apparatus 101a has been shut down by an operation by a user and performs the initialization operation.

On the other hand, if the system shutdown factor is not the shutdown caused by the user in step S1102, the controlling unit 210 assumes that the system has been shut down by an internal determination of the image pickup apparatus 101a and performs the initialization determination process at the next startup according to the flowchart of FIG. 6. Thus, if the system has been shut down by the operation by the user, the controlling unit 210 can explicitly notify the user that the image pickup apparatus 101a has been started up by performing the initialization operation at the next startup.

Third Embodiment

Next, the third embodiment of the present invention will be described. This embodiment describes a process performed in a case where the output signal from the state detecting unit 213 is excessive during the system off.

Figure 12A:
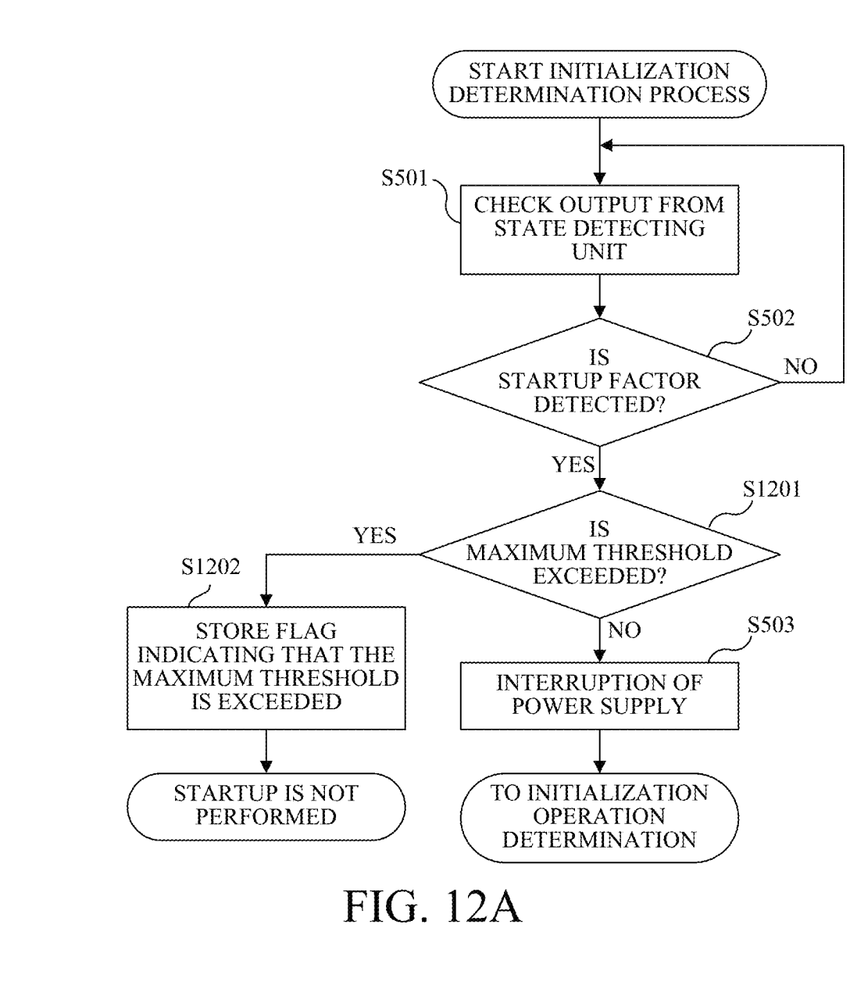
FIGS. 12A and 12B are flowcharts illustrating preprocessing for a startup determination process and an initialization determination process according to a third embodiment.
Figure 12B:
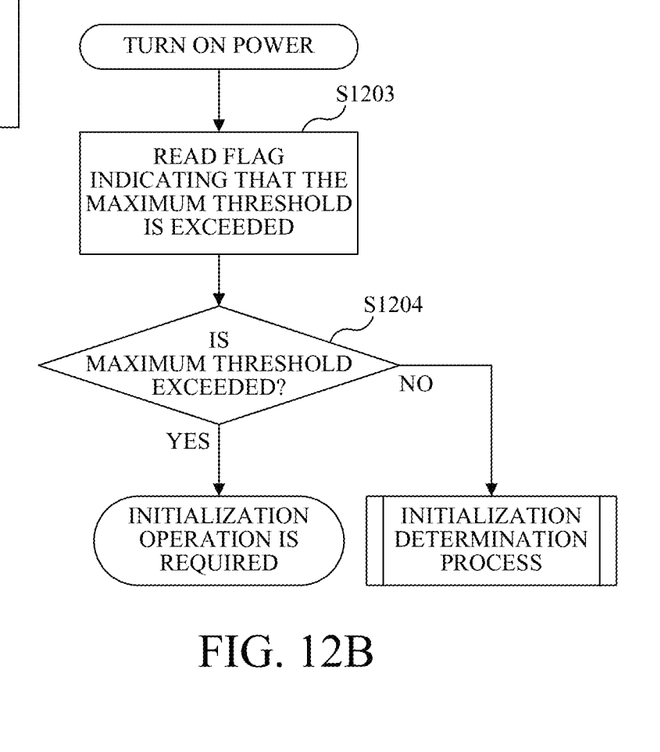

FIG. 12A is a flowchart illustrating a startup determination process according to this embodiment. FIG. 12B is a flowchart illustrating preprocessing for an initialization determination process according to this embodiment. Each step in FIGS. 12A and 12B is mainly executed by the controlling unit 210.

In this embodiment, as illustrated in FIG. 12A, a maximum threshold (or a minimum threshold) is set for the output signal from the state detecting unit 213 during the system off. First, steps S501 and S502 are similarly executed as in the first embodiment described with reference to FIG. 5. If the controlling unit 210 detects a startup factor in step S502, the process proceeds to step S1201. In step S1201, the controlling unit 210 determines whether or not the output signal from the state detecting unit 213 is larger than the maximum threshold (or smaller than the minimum threshold). If the output signal from the state detecting unit 213 is larger than the maximum threshold, the process proceeds to step S1202. In step S1202, the controlling unit 210 stores, in a memory such as the state memory unit 214, information indicating that there was an output signal larger than the maximum threshold (or smaller than the minimum threshold) during the system off (flag indicating that the maximum threshold is exceeded) and does not start the system up. On the other hand, if the output signal from the state detecting unit 213 is smaller than the maximum threshold (or larger than the minimum threshold) in step S1201, the process proceeds to step S503 similar to step S503 of FIG. 5.

In step S1203 of FIG. 12B, the controlling unit 210 reads information indicating that there was an output signal larger than the maximum threshold during the system off (flag indicating that the maximum threshold is exceeded) from the state memory unit 214. Subsequently, in step S1204, the controlling unit 210 determines whether or not there was an output signal larger than the maximum threshold. If there was an output signal larger than the maximum threshold, the controlling unit 210 performs the initialization operation. On the other hand, if there was no output signal larger than the maximum threshold, the controlling unit 210 performs the initialization determination process at the next startup according to the flowchart of FIG. 6. The controlling unit 210 sets the minimum threshold to, for example, a value close to 0 in a case where an output signal from an acceleration sensor is detected. If output smaller than the minimum threshold was detected for a certain period of time during the system off, the controlling unit 210 determines that the image pickup apparatus has fallen and the process proceeds to step S1202.

According to this embodiment, image stabilization can be performed by performing the initialization operation at the next startup while an erroneous startup caused by a shock of the falling or the like is prevented. In addition, by performing the initialization operation, it is possible to check whether or not there is a failure in the driving of the image pickup apparatus if the output larger than the maximum threshold is acquired.

Fourth Embodiment

Next, the fourth embodiment of the present invention will be described. In each of the first to third embodiments, a description is given of the initialization determination process of the rotational axis of the lens barrel 102, but in this embodiment, a description will be given of an initialization determination process in a case where a plurality of rotational axes (first rotational axis and second rotational axis) exist.

Figure 13:
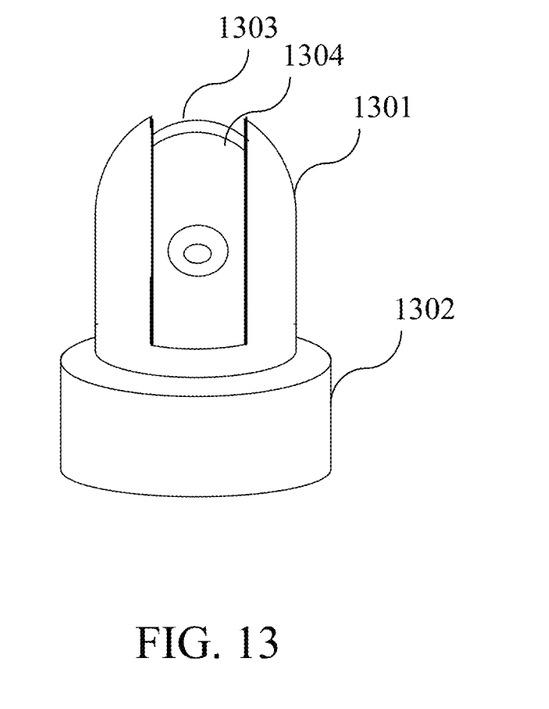
FIG. 13 is a schematic diagram illustrating an image pickup apparatus according to a fourth embodiment.

FIG. 13 is a schematic diagram illustrating an image pickup apparatus (driving apparatus) 101b according to this embodiment. The image pickup apparatus 101b includes movable portions 1301 and 1304, a fixed portion 1302, and a cover 1303. The movable portion 1301 can be rotated in a horizontal (panning) direction relatively to the fixed portion 1302 by a first rotation driving unit such as the panning rotation unit 105. The movable portion 1304 can be rotated in a vertical (tilting) direction relatively to the fixed portion 1302 by a second rotation driving unit such as the tilting rotation unit 104. A tilting plane is covered with a cover 1303. Thus, the movable portion 1301 can be rotated by an operation by a user, but the movable portion 1304 cannot be rotated by the user.

In a case where the image pickup apparatus 101b has a plurality of rotational axes, conditions used for the initialization determination described in the first embodiment may be different depending on the rotational axes. For example, if a rotation in the panning direction is detected during the system off and a positional deviation between at the time of the system startup and at the time of the last system off is equal to or larger than a threshold, the first initialization condition and the second initialization condition are satisfied in the panning direction. Therefore, the initialization operation is performed in the panning direction, but is not performed in the tilting direction. Thus, if the initialization condition is set for each axis, it is possible to perform the initialization operation only in a case where the initialization operation is required for each axis.

Other Embodiments

Embodiments) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In each embodiment, the driving apparatus (image pickup apparatuses 101, 101a, and 101b) includes the rotation driving unit (lens barrel rotation driving unit 212), the state detecting unit (state detecting unit 213), and a controlling unit (controlling unit 210). The rotation driving unit rotationally drives the movable portion (lens barrel 102) of the image pickup apparatus. The state detecting unit detects the state of the image pickup apparatus. The controlling unit determines whether or not to perform the initialization operation by the rotation driving unit. The controlling unit determines whether or not to perform the initialization operation based on at least one of the change in the state of the image pickup apparatus during the system off and the change in the state (state deviation) between at the time of the system shutdown and at the time of the system startup, the changes being acquired from the output signal from the state detecting unit.

If the controlling unit determines to perform the initialization operation, the rotation driving unit may rotationally drive the movable portion during the system startup of the image pickup apparatus for positioning. The system off may be a state in which the image pickup apparatus is turned off or is in the low power consumption mode, the system shutdown may be turning off of the image pickup apparatus or the transition to the low power consumption mode of the image pickup apparatus, and the system startup may be turning on of the image pickup apparatus or the return from the low power consumption mode of the image pickup apparatus. The controlling unit may change the control on the initialization operation at the time of the system startup. If the shake acquired from the output signal from the state detecting unit is larger than the first shake threshold, the controlling unit may determine that the state of the image pickup apparatus changed during the system off. If the elapsed time acquired from the output signal from the state detecting unit is longer than the first time threshold, the controlling unit may determine that the state of the image pickup apparatus changed during the system off.

The state detecting unit may be a position detecting sensor. If there is the predetermined signal difference between the output signal from the state detecting unit at the time of the system startup and the output signal from the state detecting unit at the time of the last system shutdown, the controlling unit may assume that the state changed and may perform the initialization operation. If there is a predetermined difference between the captured image detected by the state detecting unit at the time of the system startup and the captured image detected by the state detecting unit at the time of the last system shutdown, the controlling unit may assume that the state changed and may perform the initialization operation.

If the shake acquired from the output signal from the state detecting unit is equal to or larger than the second shake threshold that is larger than the first threshold, the controlling unit may not perform the system startup and perform the initialization operation at the next system startup. If the falling of the image pickup apparatus is detected based on the output signal from the state detecting unit, the controlling unit may not perform the system startup and perform the initialization operation at the next system startup. The controlling unit may determine whether or not to perform the initialization operation based on whether the system shutdown factor of the image pickup apparatus is the operation by the user or the determination by the image pickup apparatus.

The rotation driving unit may include the first rotation driving unit (panning rotation unit 105) that rotationally drives the movable portion about the first rotational axis and the second rotation driving unit (tilting rotation unit 104) that rotationally drives the movable portion about the second rotational axis that is different from the first rotational axis. The controlling unit determines whether or not to perform the initialization operation individually fix the first rotation driving unit and the second rotation driving unit, based on at least one of the change in the state of the image pickup apparatus during the system off and the change in the state of the image pickup apparatus between at the time of the system shutdown and at the time of the system startup. If the first rotation driving unit rotationally drives the movable portion about the first rotational axis, the controlling unit may perform the initialization operation by the first rotation driving unit and may not perform the initialization operation by the second rotation driving unit. If the state detecting unit detects shock (of falling or the like), the controlling unit may perform the initialization operation by each of the first rotation driving unit and the second rotation driving unit.

According to each embodiment, the image pickup apparatus can improve attractiveness, power, and startup time by determining whether or not to perform the initialization operation based on the condition at the time of startup. Therefore, according to each embodiment, it is possible to provide a driving apparatus, an image pickup apparatus, a controlling method for a driving apparatus, and a memory medium each of which can properly perform the initialization determination process without an erroneous determination being made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Each embodiment can be widely applied to an image pickup apparatus (driving apparatus) that performs panning and tilting operations, such as a digital camera, a digital video camera, a mobile phone, a surveillance camera, and a web camera

What is claimed is:

1. A driving apparatus comprising:
a rotation driving unit configured to change a direction of an optical axis of an image pickup optical system by rotationally driving a movable portion of an image pickup apparatus with respect to a rotational axis;
a state detecting unit configured to detect a state of the image pickup apparatus; and
a controlling unit configured to determine whether or not to perform an initialization operation for changing the direction of the optical axis by the rotation driving unit,
wherein the controlling unit determines whether or not to perform the initialization operation based on at least one of a change in the state of the image pickup apparatus during a system off and a change in the state of the image pickup apparatus between at a time of a system shutdown and at a time of a system startup, each change being acquired from an output signal from the state detecting unit.

2. The driving apparatus according to claim 1, wherein in a case where the controlling unit determines to perform the initialization operation, the rotation driving unit adjusts a position of the movable portion by rotationally driving the movable portion at the time of the system startup of the image pickup apparatus.

3. The driving apparatus according to claim 1, wherein the system off is a state in which the image pickup apparatus is turned off or is in a low power consumption mode,
wherein the system shutdown is turning off of the image pickup apparatus or a transition to the low power consumption mode of the image pickup apparatus, and
wherein the system startup is turning on of the image pickup apparatus or a return from the low power consumption mode of the image pickup apparatus.

4. The driving apparatus according to claim 1, wherein at the time of the system startup, the controlling unit changes control on the initialization operation.

5. The driving apparatus according to claim 1, wherein in a case where a shake acquired from the output signal from the state detecting unit is larger than a first shake threshold, the controlling unit determines that the state of the image pickup apparatus changed during the system off.

6. The driving apparatus according to claim 1, wherein in a case where an elapsed time acquired from the output signal from the state detecting unit is longer than a first time threshold, the controlling unit determines that the state of the image pickup apparatus changed during the system off.

7. The driving apparatus according to claim 1, wherein the state detecting unit is a position detecting sensor, and
wherein in a case where there is a predetermined signal difference between an output signal from the state detecting unit at the time of the system startup and an output signal from the state detecting unit at a time of a last system shutdown, the controlling unit assumes that the state of the image pickup apparatus changed and performs the initialization operation.

8. The driving apparatus according to claim 1, wherein in a case where there is a predetermined difference between a captured image detected by the state detecting unit at the time of the system startup and a captured image detected by the state detecting unit at a time of a last system shutdown, the controlling unit assumes that the state of the image pickup apparatus changed and performs the initialization operation.

9. The driving apparatus according to claim 5, wherein in a case where a shake acquired from the output signal from the state detecting unit is equal to or larger than a second shake threshold that is larger than the first shake threshold, the controlling unit does not perform the system startup and performs the initialization operation at a time of a next system startup.

10. The driving apparatus according to claim 1, wherein in a case where, based on the output signal from the state detecting unit, falling of the image pickup apparatus is detected, the controlling unit does not perform the system startup and performs the initialization operation at a time of a next system startup.

11. The driving apparatus according to claim 1, wherein the controlling unit determines whether or not to perform the initialization operation based on whether a system shutdown factor of the image pickup apparatus is an operation by a user or a determination by the image pickup apparatus.

12. The driving apparatus according to claim 1, wherein the rotation driving unit includes:
   a first rotation driving unit configured to rotationally drive the movable portion about a first rotational axis; and
   a second rotation driving unit configured to rotationally drive the movable portion about a second rotational axis that is different from the first rotational axis, and
   wherein the controlling unit determines whether or not to perform the initialization operation individually for the first rotation driving unit and the second rotation driving unit based on at least one of the change in the state of the image pickup apparatus during the system off and the change in the state of the image pickup apparatus between at the time of the system shutdown and at the time of the system startup.

13. The driving apparatus according to claim 12, wherein in a case where the first rotation driving unit rotationally drives the movable portion about the first rotational axis, the controlling unit performs the initialization operation by the first rotation driving unit and does not perform the initialization operation by the second rotation driving unit.

14. The driving apparatus according to claim 12, wherein in a case where the state detecting unit detects a shock, the controlling unit performs the initialization operation by each of the first rotation driving unit and the second rotation driving unit.

15. An image pickup apparatus comprising:
   the driving apparatus according to claim 1; and
   an image pickup unit.

16. A controlling method for a driving apparatus that includes a rotation driving unit configured to change a direction of an optical axis of an image pickup optical system by rotationally driving a movable portion of an image pickup apparatus with respect to a rotational axis, the controlling method comprising:
   detecting a state of the image pickup apparatus by a state detecting unit; and
   determining whether or not to perform an initialization operation for changing the direction of the optical axis by the rotation driving unit,
   wherein the determining determines whether or not to perform the initialization operation based on at least one of a change in the state of the image pickup apparatus during a system off and a change in the state of the image pickup apparatus between at a time of a system shutdown and at a time of a system startup, each change being acquired from an output signal from the state detecting unit.

17. A non-transitory computer-readable memory medium storing a computer program that causes a computer of an image display apparatus to execute a controlling method according to claim 16.

* * * * *